Patented Jan. 28, 1930

1,745,221

UNITED STATES PATENT OFFICE

BERNHARD KEISER, OF WEBSTER GROVES, MISSOURI

NEW HYDROXYLATED SULPHONATION PRODUCT

No Drawing.   Application filed January 21, 1929. Serial No. 334,122.

This invention relates to a new hydroxylated sulphonation product, and to a method of producing same.

One object of my invention is to provide a new material that is capable of use for various industrial purposes, and which is particularly adapted for use as a textile soap, as a Turkey-red oil substitute and as a treating agent or demulsifying agent for the resolution of petroleum emulsions of the water-in-oil type.

Another object is to provide a substance or material derived from drying oils that is non-lumpy and non-stringy; that is of relatively low viscosity; that has a relatively high iodine value and hydroxyl value and which is relatively easy to obtain in water-soluble form.

The new material, composition of matter or chemical compound that forms the subject-matter of this application for patent may be properly described as a water-soluble "hydroxylated sulphonation product". It is produced, obtained or derived from fatty acids of drying oils of the linseed oil type, such as linseed oil, and Perilla oil, the expression "linseed oil type" being herein used to mean linseed oil or Perilla oil, and not to include other unsaturated oils, such as cottonseed oil, marine oil, etc.

The production of sulphonation fatty bodies by the action of a suitable sulphonating agent, such as sulfuric acid, on non-drying oils, such as castor oil or red oil, is a well-known art. The material produced by the above reaction, after proper washing and total or partial saponification with a suitable base, such as ammonia or potash, is capable of use for various purposes. Such reactions are conducted at relatively low temperatures—approximating 35° C. The sulfuric acid reacts principally to give an acid sulfate. On washing, this acid sulfate is totally or partially hydrolyzed into an hydroxy body, such as hydroxystearic acid. Sulfuric acid reacts with the original fatty material at either a double bond or else at the hydroxyl radical. When sulfuric acid reacts at the double bond, as in the case of oleic acid, it saturates this bond with an hydrogen ion and an $HSO_4$ radical, thus producing stearo-sulfuric acid. Said stearo-sulfuric acid, as previously related, reacts partially or totally with water during the washing process, employed to remove excess acid, so as to give hydroxystearic acid. When sulfuric acid reacts with an hydroxy body, such as castor oil, at the hydroxyl radical, it removes this by the splitting of water, and replaces it with an $HSO_4$ radical. On washing, this $HSO_4$ radical is totally or partially removed with the substitution of the hydroxyl radical, as in the original hydroxylated fatty material.

For varying purposes, in actual manufacture, the conditions of washing may be varied so as to completely decompose the acid sulfates and yield an hydroxylated material substantially free from combined sulfur. In other cases, the material can be washed under such conditions as to yield a relatively high percentage of a fatty acid sulfate body. Such percentage of fatty acid sulfate body may vary from 10 to 40 percent. Generally speaking, the material obtained by the procedure above described represents an average yield of about 20 percent fatty acid sulfate body. The manufacture of Turkey-red oil or substitutes, so as to yield substances of such varying compositions, as indicated, is a well-known practice in the art.

Since the value of Turkey-red oil and allied bodies rests essentially in their content of hydroxy bodies and acid sulfate bodies, it is obvious that it would be highly desirable to use drying oils of the linseed oil type, such as linseed oil, or Perilla oil, as the raw material in the manufacture of such products, due to the fact that these drying oils are more reactive towards sulfuric acid than ordinary non-drying, unsaturated oils, such as castor oil, olive oil, red oil, etc. Drying oils are differentiated from ordinary oils or non-drying oils, principally in that the major portion of their constituents have two or more double bonds, as compared with a single double bond in an ordinary non-drying unsaturated oil. Generally speaking, the iodine value of drying oils is 140 or more, as compared with the value of 90 for ordinary unsaturated non-drying oils. Since drying oils have more than one double bond, they are obviously more reactive towards sulfuric acid, and thus can absorb or react with two or more moles of sulfuric acid instead of one mole, as is usually the case for an oil having only a single double bond. However, drying oils have another predominant characteristic, namely, a drying property that is due in part to the readiness with which they polymerize to give thick, viscous bodies suggestive of linoleum or rubber substitutes.

Accordingly, when a suitable sulphonating agent such as sulfuric acid is added, even though cautiously, to a drying oil of the linseed oil type, such as linseed oil or Perilla oil, the product produced by the reaction apparently polymerizes in part, and becomes lumpy and stringy. This occurs even if the oil is stirred cautiously, and even if the acid is as weak as 60° Baumé, and even if the temperature of the reaction is carefully controlled. Acid weaker than 64° Baumé does not completely sulphonate the oil, and in fact, appears to alter it relatively little. The lumpy, stringy sulphonated oil does not become water-soluble, regardless of temperature of sulphonation. The analysis of such oil produced from linseed oil indicates that the iodine number has dropped from 180 to about 60. There is substantially no combined sulfur. The hydroxyl value is very low, being about 15. These results indicate as follows: That the oil has become saturated, due to the formation of a sulpho-acid, and may even be polymerized in the acidified state. The washing of said sulpho-acid produces substances probably hydroxylated in nature, which tend to immediately polymerize further, if possible. Therefore, the material so produced does not have the characteristics of a Turkey-red oil substitute, namely, it has substantially no acid sulfate, and it has substantially no hydroxyl value. Not only does it lack these desirable properties, but it also has certain undesirable properties, due to polymerization. These undesirable properties are high viscosity, stringiness, etc.

I have discovered that if drying oils of the general class above referred to are first converted into fatty acids, said fatty acids can be sulphonated to yield a new chemical compound or composition of matter, which is of great commercial value in industries employing Turkey-red oils and their substitutes, textile soaps, demulsifying agents for petroleum emulsions, etc. I believe that the sulphonation of fatty acids derived from drying oils of the type described above is broadly new, and results in a chemical compound that has not heretofore been known. I have previously referred to the rather valueless nature of materials obtained by the sulphonation of drying oils themselves. Some of the valuable characteristics of materials that are obtained by the sulphonation of the fatty acids of drying oils of the type described above are that they are non-lumpy and non-stringy; they are of relatively low viscosity; they are relatively easy to obtain in water-soluble form; they have a higher iodine value and a higher hydroxyl value; and they usually show a large percentage of a fatty acid sulfate.

The method, briefly described, of producing my new material or chemical product, is to treat fatty acids of drying oils of the type described above with sulfuric acid or other suitable sulphonating agent, in a manner similar to the production of Turkey-red oil. There are a number of suitable methods for producing fatty acids from the fatty oils. One method is to saponify fatty oils so as to produce a soap and decompose the soap with a dilute acid. Another method is to acidify the fatty oil with sulfuric acid and hydrolyze with steam under pressure. Another method is to subject the fatty oil to the action of enzymes. A method that is widely employed today is the Twitchell process. In the Twitchell process, the fatty oil is mixed with a small amount of an acidified catalyst, and then boiled with live steam. This is a well known process, and is the one that I prefer to use, in order to obtain my raw material, namely, fatty acids of drying oils of the above described kind.

As previously stated, the general procedure used in the production of my new material or chemical compound is to treat fatty acids of drying oils of the type described above with sulfuric acid or other suitable sulphonating agent in a manner similar to the production of Turkey-red oil, except at a somewhat higher temperature, such as 55° C. Such procedure depends upon the addition of a sulphonating agent, such as sulfuric acid, to a drying oil fatty acid in slight or moderate excess at a temperature of about 55° C. After all the sulfuric acid is added, the fatty mass may be allowed to stand or else may be washed immediately with one or more washes to yield a fatty mass free from sulfuric acid. Such washing process may take place at a low temperature or at or near the boiling point of water, and if desired, in the presence of a mineral acid. After separation, the fatty layer is subsequently saponified partially or totally with a suitable base, such as caustic soda, ammonia, caustic potash, etc.

The product obtained by such procedure, is never lumpy or stringy; it has a relatively low viscosity; and it is in water-soluble form. In the sulphonation process itself, the temperature can be raised to 55° C. without producing polymerization. Analysis of the fatty acid after such sulphonation shows an iodine value of about 80. The material usually shows a large percentage of a fatty acid sulfate. The hydroxyl value is approximately 95. The washing process can be conducted so that the fatty acid sulfate is substantially entirely decomposed, but in this event, the hydroxyl value will be even higher than the above stated value. Thus, it is obvious that the physical and chemical properties of the sulphonation product produced from the fatty acids are entirely different from those of the product obtained by sulphonating the parent oil. Said sulphonation product has many valuable applications in the industrial arts which furthermore distinguishes it in the point of utility from the materials obtained by sulphonating the parent oil.

I have herein referred to my new material or compound as a water-soluble sulphonation product, because of the process or procedure used to produce such material. However, just as in the case of Turkey-red oil, the washing process may be so conducted as to completely decompose the fatty acid sulfate, and thus yield a material or substance substantially free from combined sulfur. On the other hand, as ordinarily conducted, the process yields a product having an appreciable proportion of combined sulfur, due to the presence of a fatty acid sulfate. Due to the fact that said material or compound is made by a sulphonation process and always has an appreciable hydroxyl value not present in the parent oil or original fatty acid, it may be properly termed an hydroxylated sulphonation product derived from the fatty acids of drying oils of the type described above. If said material has sulfur combined with same, it may be properly termed a sulfated hydroxylated product derived from the sulphonation of fatty acids of drying oils of the type described above. When such materials are combined with suitable bases, as previously referred to, they give water-soluble salts, and accordingly, may properly be referred to as water-soluble salts of the above broad and narrow classes, respectively, the preferred species of my new material or compound consisting of an ammonium salt of an hydroxylated sulphonation product derived from the fatty acid of a drying oil of the type described above.

One method or procedure than can be used to produce my new material, composition of matter or chemical compound, is as follows: 100 parts of linseed oil fatty acids obtained from raw linseed oil by the Twitchell process, are reacted with 50 parts of 64° Baumé sulfuric acid with constant stirring. The temperature is allowed to rise to 54° C. The reaction is continued until the sulphonated oil mass is water-soluble. 100 parts of sodium sulfate solution of 15° Baumé gravity is now added, and after thorough stirring, the mixture is allowed to stand until two layers form. The upper layer of fatty material is water-soluble in a 10 percent solution. The lower layer contains the sodium sulfate and sulfuric acid in aqueous solution. This lower layer is withdrawn. Commercial ammonia of 26° Baumé gravity is now added to neutralize the fatty acid mass. A non-viscous, non-stringy, non-polymerized amber liquid results. Sulfuric acid of 66° Baumé gravity, oleum, or chloro-sulphonic acid could be used if sufficient cooling is employed. Any base, such as sodium hydrate, potassium hydrate, or calcium hydrate could be used in place of ammonium hydrate. The above procedure produces a material that contains combined organic sulfur in the form of a sulfate, together with hydroxylated fatty acids, which material is a new composition of matter that may be properly termed an hydroxylated sulfated sulphonation product derived from the fatty acid of oils of the type described above.

Another method or procedure that may be used to produce my new material or compound is as follows: The fatty acids, after sulphonating as in the previous example, are boiled with steam and preferably in the presence of a little hydrochloric acid. Said boiling process is continued until the combined organic sulfur, namely, the fatty acid sulfate, is completely decomposed. The resulting fatty acids, more highly hydroxylated than in the first example, are neutralized, as in the previous case. Material of this type may be properly termed a new composition of matter, consisting of an hydroxylated sulphonation product derived from the fatty acids of drying oils of the type described above.

Having thus described my invention, what I claim as new and desire to secure by Letters Patent of the United States is:

1. A new composition of matter, consisting of a water-soluble hydroxylated sulphonation product derived from a fatty acid of a drying oil of the linseed oil type.

2. A new composition of matter, consisting of a water-soluble salt of an hydroxylated sulphonation product derived from a fatty acid of a drying oil of the linseed oil type.

3. A new composition of matter, consisting of the water-soluble ammonium salt of an hydroxylated sulphonation product derived from a fatty acid of a drying oil of the linseed oil type.

4. A new composition of matter, consisting of a water-soluble hydroxylated sulphonation product derived from the fatty acids of linseed oil.

5. A new composition of matter, consisting of a water-soluble salt of an hydroxylated sulphonation product derived from the fatty acids of linseed oil.

6. A new composition of matter, consisting of the water-soluble ammonium salt of an hydroxylated sulphonation product derived from the fatty acids of linseed oil.

7. A new composition of matter, consisting of a water-soluble sulfated hydroxylated sulphonation product derived from fatty acids of drying oils of the linseed oil type.

8. A new composition of matter, consisting of a water-soluble salt of a sulfated hydroxylated sulphonation product derived from fatty acids of drying oils of the linseed oil type.

9. A new composition of matter, consisting of the water-soluble ammonium salt of a sulfated hydroxylated sulphonation product derived from fatty acids of drying oils of the linseed oil type.

10. A new composition of matter, consisting of a water-soluble sulfated hydroxylated sulphonation product derived from the fatty acids of linseed oil.

11. A new composition of matter, consisting of a water-soluble salt of a sulfated hydroxylated sulphonation product derived from the fatty acids of linseed oil.

12. A new composition of matter, consisting of the water-soluble ammonium salt of a sulfated hydroxylated sulphonation product derived from the fatty acids of linseed oil.

13. A method of producing a water-soluble hydroxylated sulphonation product, characterized by subjecting a fatty acid of a drying oil of the linseed oil type to the action of a sulphonating agent at a temperature of approximately 55° C., and thereafter removing the excess sulphonating agent by a washing process.

14. A method of producing a water-soluble hydroxylated sulphonation product, characterized by subjecting a fatty acid of a drying oil of the linseed oil type to the action of a sulphonating agent at a temperature of approximately 55° C., thereafter removing the excess sulphonating agent by a washing process, and subsequently neutralizing the mixture with a suitable base.

BERNHARD KEISER.